US012679205B2

(12) United States Patent
Sarwar et al.

(10) Patent No.: US 12,679,205 B2
(45) Date of Patent: Jul. 14, 2026

(54) DETERMINING HORIZONTAL CLEARANCE FOR A VEHICLE

(71) Applicant: GM Global Technology Operations LLC, Detroit, MI (US)

(72) Inventors: Azeem Sarwar, Rochester Hills, MI (US); Md Mhafuzul Islam, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 18/513,956

(22) Filed: Nov. 20, 2023

(65) Prior Publication Data

US 2025/0162605 A1     May 22, 2025

(51) Int. Cl.
B60K 35/60          (2024.01)
B60K 35/10          (2024.01)
(Continued)

(52) U.S. Cl.
CPC .............. B60K 35/22 (2024.01); B60K 35/10 (2024.01); B60W 30/16 (2013.01); B60W 40/08 (2013.01);
(Continued)

(58) Field of Classification Search
CPC .. B60K 35/22; B60K 35/10; B60K 2360/797; B60K 2360/332; B60K 35/28; B60K 2360/171; B60K 2360/164; B60K 35/60;
B60K 2360/794; B60K 2360/179; B60W 30/16; B60W 40/08; B60W 2540/227; B60W 50/14; B60W 2530/201;
(Continued)

(56) References Cited

U.S. PATENT DOCUMENTS 6,552,659 B1 *  4/2003  Waltz ...................... E05B 83/36
                                                340/5.72
2010/0082206 A1 *  4/2010  Kollar ..................... E05F 15/43
                                                701/49
(Continued)

FOREIGN PATENT DOCUMENTS

DE          19915753 A1    10/2000
DE     102004053711 A1     5/2006
(Continued)

*Primary Examiner* — Naomi J Small
(74) *Attorney, Agent, or Firm* — Vivacqua Crane, PLLC

(57)          ABSTRACT

A system for determining horizontal clearance for a vehicle includes a ranging sensor configured to measure a distance between the vehicle and an object in an environment surrounding the vehicle. The system further may include a human-machine interface (HMI). The system further may include a controller in electrical communication with the ranging sensor and the HMI. The controller is programmed to determine an available clearance distance between a door of the vehicle and the object in the environment surrounding the vehicle using the ranging sensor. The controller is further programmed to compare the available clearance distance to one or more predetermined clearance distance thresholds. The controller is further programmed to provide information to an occupant of the vehicle using the HMI based at least in part on the available clearance distance and the one or more predetermined clearance distance thresholds.

19 Claims, 6 Drawing Sheets

(51) Int. Cl.

| | |
|---|---|
| *B60K 35/22* | (2024.01) |
| *B60W 30/16* | (2020.01) |
| *B60W 40/08* | (2012.01) |
| *B60W 50/14* | (2020.01) |
| *B60K 35/28* | (2024.01) |

(52) U.S. Cl.
CPC ............. *B60W 50/14* (2013.01); *B60K 35/28* (2024.01); *B60K 35/60* (2024.01); *B60K 2360/164* (2024.01); *B60K 2360/171* (2024.01); *B60K 2360/179* (2024.01); *B60K 2360/332* (2024.01); *B60K 2360/794* (2024.01); *B60K 2360/797* (2024.01); *B60W 2040/0881* (2013.01); *B60W 2050/146* (2013.01); *B60W 2420/403* (2013.01); *B60W 2420/54* (2013.01); *B60W 2530/201* (2020.02); *B60W 2540/227* (2020.02); *B60W 2554/801* (2020.02)

(58) Field of Classification Search
CPC ... B60W 2554/801; B60W 2040/0881; B60W 2050/146; B60W 2420/403; B60W 2420/54
USPC .......................................................... 340/435
See application file for complete search history.

(56) References Cited

U.S. PATENT DOCUMENTS

| | | | | |
|---|---|---|---|---|
| 2017/0089114 | A1* | 3/2017 | Rider | ...................... G01L 19/14 |
| 2017/0297487 | A1* | 10/2017 | Ali Khan | ............... G08G 1/165 |
| 2017/0334353 | A1* | 11/2017 | Gillott | ..................... E05F 15/43 |
| 2019/0024421 | A1* | 1/2019 | Cumbo | ................ B60Q 1/0011 |
| 2020/0254928 | A1* | 8/2020 | Monteiro | ................. B60Q 9/00 |
| 2020/0384984 | A1* | 12/2020 | Murray | ................. B60W 50/14 |
| 2021/0146841 | A1* | 5/2021 | Huizen | ................... F21S 43/15 |
| 2022/0227373 | A1* | 7/2022 | Harouche | ............ B60W 10/18 |
| 2023/0116438 | A1* | 4/2023 | Johansson | .............. E05C 17/56 |
| | | | | 49/381 |
| 2023/0160250 | A1* | 5/2023 | Goodchild | .............. E05F 15/40 |
| | | | | 49/28 |
| 2024/0183204 | A1* | 6/2024 | Patel | ...................... B60R 25/20 |

FOREIGN PATENT DOCUMENTS

| | | | |
|---|---|---|---|
| DE | 102012201038 | A1 | 7/2013 |
| DE | 102016107421 | A1 | 10/2017 |
| DE | 102016206756 | A1 | 10/2017 |
| DE | 102016120810 | A1 | 5/2018 |
| DE | 102018005055 | A1 | 11/2018 |
| DE | 102018211889 | A1 | 1/2020 |
| DE | 102019005997 | A1 | 3/2020 |
| DE | 102020207568 | A1 | 12/2021 |

* cited by examiner

DETERMINING HORIZONTAL CLEARANCE FOR A VEHICLE

INTRODUCTION

The present disclosure relates to systems and methods for increasing occupant awareness for a vehicle, and more particularly, to systems and methods for determining horizontal clearance for a vehicle.

To increase occupant comfort, convenience, and awareness, vehicles may be equipped with Advanced Driver Assistance Systems (ADAS) which are designed to assist the occupant in operating the vehicle. ADAS systems may use various sensors such as cameras, radar, ultrasound, and LIDAR to detect and identify objects around the vehicle, including other vehicles, pedestrians, and traffic signs. When a potential collision or obstacle is detected, the ADAS system may issue an alert to the occupant or take corrective action to prevent or mitigate the collision. Furthermore, vehicles may be equipped with parking sensors to assist the occupant in maneuvering the vehicle while parking, especially in confined spaces. Parking sensors may include, for example, ultrasonic ranging sensors. However, current ADAS systems and parking sensors may not assist the occupant in determining horizontal clearance available to open passenger and/or cargo doors of the vehicle.

Thus, while current ADAS and parking sensor systems and methods achieve their intended purpose, there is a need for a new and improved system and method for determining horizontal clearance for a vehicle.

SUMMARY

According to several aspects, a system for determining horizontal clearance for a vehicle is provided. The system may include a ranging sensor configured to measure a distance between the vehicle and an object in an environment surrounding the vehicle. The system further may include a human-machine interface (HMI). The system further may include a controller in electrical communication with the ranging sensor and the HMI. The controller is programmed to determine an available clearance distance between a door of the vehicle and the object in the environment surrounding the vehicle using the ranging sensor. The controller is further programmed to compare the available clearance distance to one or more predetermined clearance distance thresholds. The controller is further programmed to provide information to an occupant of the vehicle using the HMI based at least in part on the available clearance distance and the one or more predetermined clearance distance thresholds.

In another aspect of the present disclosure, the one or more predetermined clearance distance thresholds includes at least: a first clearance distance threshold indicating that the door of the vehicle is openable to an entirety of a full opening distance and a second clearance distance threshold indicating that the door of the vehicle is openable to two thirds of the full opening distance. The one or more predetermined clearance distance thresholds further includes at least: a third clearance distance threshold indicating that the door of the vehicle is openable to one third of the full opening distance and a fourth clearance distance threshold indicating that the door of the vehicle is not openable.

In another aspect of the present disclosure, the one or more predetermined clearance distance thresholds are determined based at least in part on at least one of: one or more dimensions of the vehicle and one or more dimensions of the door of the vehicle.

In another aspect of the present disclosure, the HMI further may include at least one display. To provide information to the occupant of the vehicle, the controller is further programmed to provide a first indication to the occupant of the vehicle using the at least one display in response to determining that the available clearance distance is greater than or equal to the first clearance distance threshold. To provide information to the occupant of the vehicle, the controller is further programmed to provide a second indication to the occupant of the vehicle using the at least one display in response to determining that the available clearance distance is greater than or equal to the second clearance distance threshold and less than the first clearance distance threshold. To provide information to the occupant of the vehicle, the controller is further programmed to provide a third indication to the occupant of the vehicle using the at least one display in response to determining that the available clearance distance is greater than or equal to the third clearance distance threshold and less than the second clearance distance threshold. To provide information to the occupant of the vehicle, the controller is further programmed to provide a fourth indication to the occupant of the vehicle using the at least one display in response to determining that the available clearance distance is less than or equal to the fourth clearance distance threshold.

In another aspect of the present disclosure, the at least one display includes at least one LED array. The first indication includes illuminating a first LED of the LED array. The second indication includes illuminating a second LED of the LED array. The third indication includes illuminating a third LED of the LED array. The fourth indication includes illuminating a fourth LED of the LED array.

In another aspect of the present disclosure, the at least one LED array further may include a first LED array affixed to an exterior surface of the door of the vehicle adjacent to an exterior handle of the door of the vehicle. The at least one LED array further may include a second LED array affixed to an interior surface of the door of the vehicle adjacent to an interior handle of the door of the vehicle.

In another aspect of the present disclosure, the at least one display includes an infotainment display. The first indication includes a visual representation of the vehicle depicting the available clearance distance relative to the first clearance distance threshold. The second indication includes the visual representation of the vehicle depicting the available clearance distance relative to the second clearance distance threshold and the first clearance distance threshold. The third indication includes the visual representation of the vehicle depicting the available clearance distance relative to the third clearance distance threshold and the second clearance distance threshold. The fourth indication includes the visual representation of the vehicle depicting the available clearance distance relative to the fourth clearance distance threshold.

In another aspect of the present disclosure, to provide information to the occupant of the vehicle, the controller is further programmed to determine a location of the occupant relative to the vehicle. The location of the occupant includes one of inside of the vehicle and outside of the vehicle. To provide information to the occupant of the vehicle, the controller is further programmed to provide at least one of: the first indication, the second indication, the third indication, and the fourth indication using the infotainment display in response to determining that the location of the occupant is inside of the vehicle.

In another aspect of the present disclosure, the ranging sensor further may include one or more ultrasonic distance measurement sensors affixed to the door of the vehicle. To determine the available clearance distance, the controller is further programmed to determine the available clearance distance between a door of the vehicle and the object in the environment surrounding the vehicle using the one or more ultrasonic distance measurement sensors.

In another aspect of the present disclosure, the ranging sensor further may include a camera system. To determine the available clearance distance the controller is further programmed to determine the available clearance distance between a door of the vehicle and the object in the environment surrounding the vehicle using the camera system.

According to several aspects, a method for determining horizontal clearance for a vehicle is provided. The method may include determining an available clearance distance between a door of the vehicle and an object in an environment surrounding the vehicle using a ranging sensor. The method further may include comparing the available clearance distance to one or more predetermined clearance distance thresholds. The method further may include providing information to an occupant of the vehicle using a human-machine interface (HMI) based at least in part on the available clearance distance and the one or more predetermined clearance distance thresholds.

In another aspect of the present disclosure, comparing the available clearance distance to the one or more predetermined clearance distance thresholds further may include comparing the available clearance distance to a first clearance distance threshold indicating that the door of the vehicle is openable to an entirety of a full opening distance. Comparing the available clearance distance to the one or more predetermined clearance distance thresholds further may include comparing the available clearance distance to a second clearance distance threshold indicating that the door of the vehicle is openable to two thirds of the full opening distance. Comparing the available clearance distance to the one or more predetermined clearance distance thresholds further may include comparing the available clearance distance to a third clearance distance threshold indicating that the door of the vehicle is openable to one third of the full opening distance. Comparing the available clearance distance to the one or more predetermined clearance distance thresholds further may include comparing the available clearance distance to a fourth clearance distance threshold indicating that the door of the vehicle is not openable.

In another aspect of the present disclosure, providing information to the occupant of the vehicle further may include providing a first indication to the occupant of the vehicle using the HMI in response to determining that the available clearance distance is greater than or equal to the first clearance distance threshold. Providing information to the occupant of the vehicle further may include providing a second indication to the occupant of the vehicle using the HMI in response to determining that the available clearance distance is greater than or equal to the second clearance distance threshold and less than the first clearance distance threshold. Providing information to the occupant of the vehicle further may include providing a third indication to the occupant of the vehicle using the HMI in response to determining that the available clearance distance is greater than or equal to the third clearance distance threshold and less than the second clearance distance threshold. Providing information to the occupant of the vehicle further may include providing a fourth indication to the occupant of the vehicle using the HMI in response to determining that the available clearance distance is less than or equal to the fourth clearance distance threshold.

In another aspect of the present disclosure, providing information to the occupant of the vehicle further may include illuminating a first LED of at least one of: a first LED array of the HMI affixed to an exterior surface of the door of the vehicle adjacent to an exterior handle of the door of the vehicle and a second LED array of the HMI affixed to an interior surface of the door of the vehicle adjacent to an interior handle of the door of the vehicle to provide the first indication. Providing information to the occupant of the vehicle further may include illuminating a second LED of at least one of: the first LED array and the second LED array to provide the second indication. Providing information to the occupant of the vehicle further may include illuminating a third LED of at least one of: the first LED array and the second LED array to provide the third indication. Providing information to the occupant of the vehicle further may include illuminating a fourth LED of at least one of: the first LED array and the second LED array to provide the fourth indication.

In another aspect of the present disclosure, providing information to the occupant of the vehicle further may include displaying a visual representation of the vehicle depicting the available clearance distance relative to the first clearance distance threshold using an infotainment display of the HMI to provide the first indication. Providing information to the occupant of the vehicle further may include displaying the visual representation of the vehicle depicting the available clearance distance relative to the second clearance distance threshold and the first clearance distance threshold using the infotainment display of the HMI to provide the second indication. Providing information to the occupant of the vehicle further may include displaying the visual representation of the vehicle depicting the available clearance distance relative to the third clearance distance threshold and the second clearance distance threshold using the infotainment display of the HMI to provide the third indication. Providing information to the occupant of the vehicle further may include displaying the visual representation of the vehicle depicting the available clearance distance relative to the fourth clearance distance threshold using the infotainment display of the HMI to provide the fourth indication.

In another aspect of the present disclosure, providing information to the occupant of the vehicle further may include determining a location of the occupant relative to the vehicle. Providing information to the occupant of the vehicle further may include providing at least one of: the first indication, the second indication, the third indication, and the fourth indication using at least one of: the infotainment display, the first LED array, and the second LED array based at least in part on the location of the occupant relative to the vehicle.

In another aspect of the present disclosure, providing information to the occupant of the vehicle further may include determining the location of the occupant relative to the vehicle. The location of the occupant includes one of inside of the vehicle and outside of the vehicle; providing at least one of: the first indication, the second indication, the third indication, and the fourth indication using the info-tainment display and the second LED array in response to determining that the location of the occupant is inside of the vehicle. Providing information to the occupant of the vehicle further may include providing at least one of: the first indication, the second indication, the third indication, and the fourth indication using the first LED array in response to determining that the location of the occupant is outside of the vehicle.

According to several aspects, a system for determining horizontal clearance for a vehicle is provided. The system may include a ranging sensor configured to measure a distance between the vehicle and an object in an environment surrounding the vehicle. The ranging sensor includes at least one of: one or more ultrasonic distance measurement sensors and a camera system. The system further may include a human-machine interface (HMI). The HMI may include a first LED array affixed to an exterior surface of a door of the vehicle adjacent to an exterior handle of the door of the vehicle. The HMI further may include a second LED array affixed to an interior surface of the door of the vehicle adjacent to an interior handle of the door of the vehicle. The HMI further may include an infotainment display disposed within the vehicle. The system further may include a controller in electrical communication with the ranging sensor and the HMI. The controller is programmed to determine an available clearance distance between a door of the vehicle and the object in the environment surrounding the vehicle using the ranging sensor. The controller is further programmed to compare the available clearance distance to a first clearance distance threshold indicating that the door of the vehicle is openable to an entirety of a full opening distance, a second clearance distance threshold indicating that the door of the vehicle is openable to two thirds of the full opening distance, a third clearance distance threshold indicating that the door of the vehicle is openable to one third of the full opening distance, and a fourth clearance distance threshold indicating that the door of the vehicle is not openable. The controller is further programmed to provide a first indication to an occupant of the vehicle using the HMI in response to determining that the available clearance distance is greater than or equal to the first clearance distance threshold. The controller is further programmed to provide a second indication to the occupant of the vehicle using the HMI in response to determining that the available clearance distance is greater than or equal to the second clearance distance threshold and less than the first clearance distance threshold. The controller is further programmed to provide a third indication to the occupant of the vehicle using the HMI in response to determining that the available clearance distance is greater than or equal to the third clearance distance threshold and less than the second clearance distance threshold. The controller is further programmed to provide a fourth indication to the occupant of the vehicle using the HMI in response to determining that the available clearance distance is less than or equal to the fourth clearance distance threshold.

In another aspect of the present disclosure, the controller is further programmed to illuminate a first LED of at least one of: the first LED array the second LED array to provide the first indication. The controller is further programmed to illuminate a second LED of at least one of: the first LED array and the second LED array to provide the second indication. The controller is further programmed to illuminate a third LED of at least one of: the first LED array and the second LED array to provide the third indication. The controller is further programmed to illuminate a fourth LED of at least one of: the first LED array and the second LED array to provide the fourth indication.

In another aspect of the present disclosure, the controller is further programmed to display a visual representation of the vehicle depicting the available clearance distance relative to the first clearance distance threshold using the infotainment display to provide the first indication. The controller is further programmed to display the visual representation of the vehicle depicting the available clearance distance relative to the second clearance distance threshold and the first clearance distance threshold using the infotainment display to provide the second indication. The controller is further programmed to display the visual representation of the vehicle depicting the available clearance distance relative to the third clearance distance threshold and the second clearance distance threshold using the infotainment display to provide the third indication. The controller is further programmed to display the visual representation of the vehicle depicting the available clearance distance relative to the fourth clearance distance threshold using the infotainment display to provide the fourth indication.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, occupants of a vehicle may desire to open passenger and/or cargo doors of the vehicle when parked in confined spaces. ADAS and parking assistance systems may assist the occupant in maneuvering and/or parking the vehicle in confined spaces. However, ADAS and parking assistance systems may not assist the occupant in determining whether, and to what extent, passenger doors and/or cargo doors of the vehicle may be opened without collision with other vehicles, objects, or obstructions in the environment surrounding the vehicle. Therefore, the present disclosure provides a new and improved system and method for determining horizontal clearance for a vehicle and providing information to the occupant about available horizontal clearance when opening passenger and/or cargo doors.

Figure 1:
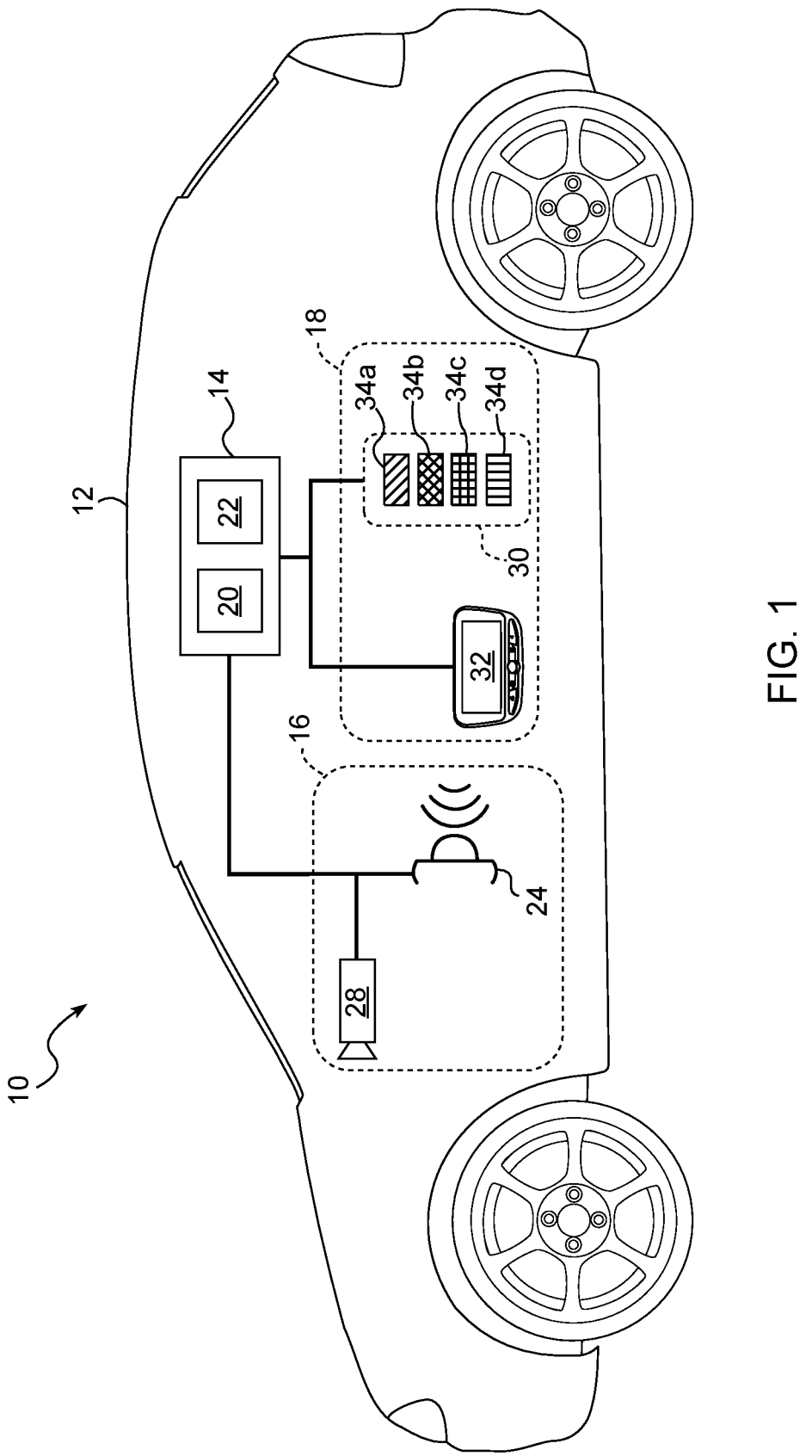
FIG. 1 is a schematic diagram of a system for determining horizontal clearance for a vehicle, according to an exemplary embodiment.

Referring to FIG. 1, a system for determining horizontal clearance for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a ranging sensor 16, and a human-machine interface (HMI) 18.

The controller 14 is used to implement a method 100 for determining horizontal clearance for a vehicle, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the ranging sensor 16 and the human-machine interface (HMI) 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The ranging sensor 16 is used to measure a distance between the vehicle 12 and objects in an environment surrounding the vehicle 12. In a first exemplary embodiment, the ranging sensor 16 includes one or more ultrasonic distance measurement sensors 24. In a second exemplary embodiment, the ranging sensor 16 includes a camera system 28. In a third exemplary embodiment, the ranging sensor 16 includes both the one or more ultrasonic distance measurement sensors 24 and the camera system 28. It should be understood that various additional types of sensors, such as, for example, LiDAR sensors, radar sensors, and/or time-of-flight sensors are also within the scope of the present disclosure.

The one or more ultrasonic distance measurement sensors 24 include a transducer and a receiver. The transducer emits ultrasonic pulses, and the receiver captures ultrasonic pulses after they have reflected off of an object. In a non-limiting example, the transducer transmits ultrasonic waves, which bounce off the object and return to the receiver. The one or more ultrasonic distance measurement sensors 24 measure the time it takes for the ultrasonic pulses to make the round trip and calculate a distance based on the speed of sound in a given medium (e.g., air). In a non-limiting example, the one or more ultrasonic distance measurement sensors 24 are affixed to an exterior door surface 26a, 26c (FIGS. 2A, 3) of one or more doors of the vehicle 12. In the scope of the present disclosure, doors of the vehicle 12 include passenger doors (e.g., driver's door, front passenger's door, rear passenger doors, and/or the like) and cargo doors (e.g., trunks, frunks, hatches, liftgates, tailgates, and/or the like). The one or more ultrasonic distance measurement sensors 24 are in electrical communication with the controller 14, as discussed above.

The camera system 28 is used to capture images and/or videos of the environment surrounding the vehicle 12. In an exemplary embodiment, the camera system 28 includes a photo and/or video camera which is positioned to view the environment surrounding the vehicle 12. In a non-limiting example, the camera system 28 includes cameras affixed inside of the vehicle 12, for example, in a headliner of the vehicle 12, having a view through a windscreen. In another non-limiting example, the camera system 28 includes cameras affixed outside of the vehicle 12, for example, on a roof of the vehicle 12, having a view of the environment in front of the vehicle 12.

In another exemplary embodiment, the camera system 28 is a surround view camera system including a plurality of cameras (also known as satellite cameras) arranged to provide a view of the environment adjacent to all sides of the vehicle 12. In a non-limiting example, the camera system 28 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 28 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. The camera system 28 is in electrical communication with the controller 14, as discussed above.

The human-machine interface (HMI) 18 is used to provide information to an occupant of the vehicle 12. In the scope of the present disclosure, the occupant includes a driver and/or a passenger of the vehicle 12. In a first exemplary embodiment, the HMI 18 includes at least one light emitting diode (LED) array 30. In a second exemplary embodiment, the HMI 18 includes an infotainment display 32. In a third exemplary embodiment, the HMI 18 includes both the at least one LED array 30 and the infotainment display 32. It should be understood that the HMI 18 further may include additional display systems, such as, for example, a head-up display (HUD), an augmented reality head-up display (AR-HUD), and/or the like without departing from the scope of the present disclosure.

The at least one LED array 30 is used to provide information to the occupant of the vehicle 12. In an exemplary embodiment, the at least one LED array 30 includes one or more LEDs operable to illuminate with a plurality of colors. In a first exemplary embodiment, the at least one LED array 30 includes a single multi-color LED operable to illuminate with a plurality of colors, including, for example, green, yellow, orange, and red. In a second exemplary embodiment, the at least one LED array 30 includes a plurality of LEDs. Each of the plurality of LEDs is operable to illuminate with one or more colors. In a non-limiting example, the at least one LED array 30 includes a first LED 34a operable to illuminate with a green color, a second LED 34b operable to illuminate with an orange color, a third LED 34c operable to illuminate with a yellow color, and a fourth LED 34d operable to illuminate with a red color. It should be understood that the number and color of LEDs in the at least one LED array 30 described above is merely exemplary in nature, and that variations in the number and/or color of LEDs are within the scope of the present disclosure. Furthermore, it should be understood that one or more displays (e.g., LCD displays, LED displays, and/or the like) may be used in place of the at least one LED array 30 without departing from the scope of the present disclosure.

Figure 2B:
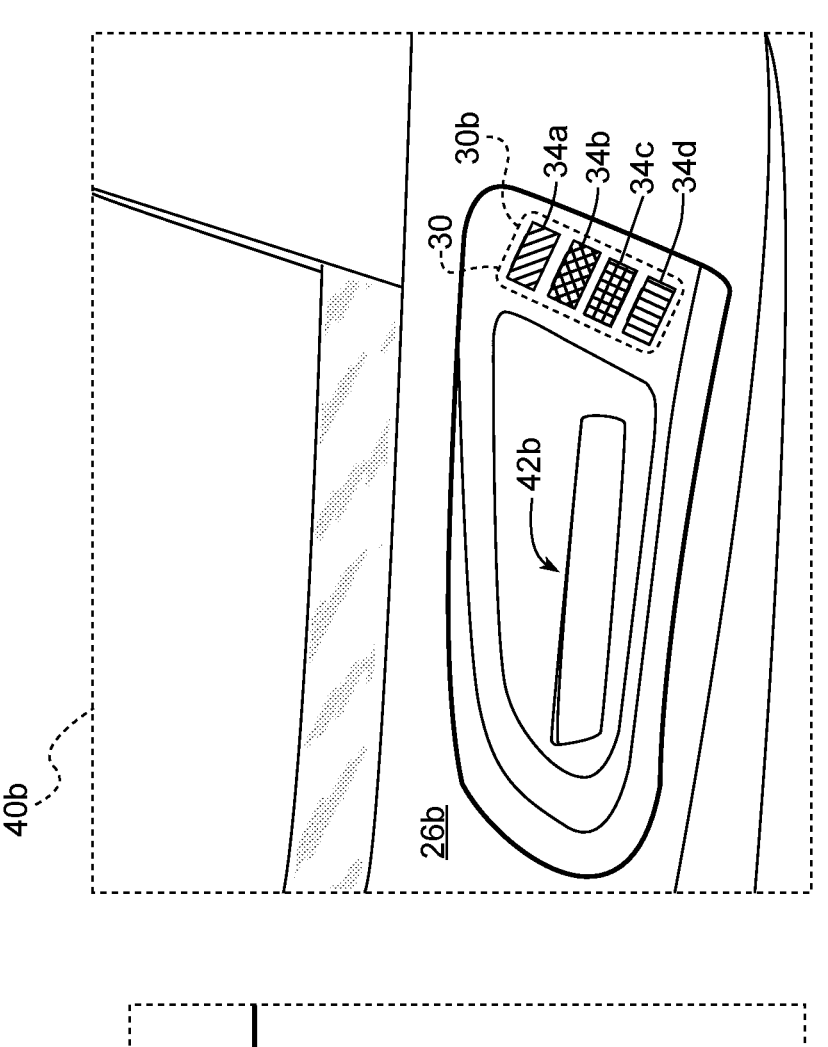
FIG. 2B is a schematic diagram of an interior passenger door surface of a passenger door of the vehicle including an LED array, according to an exemplary embodiment.
Figure 2A:
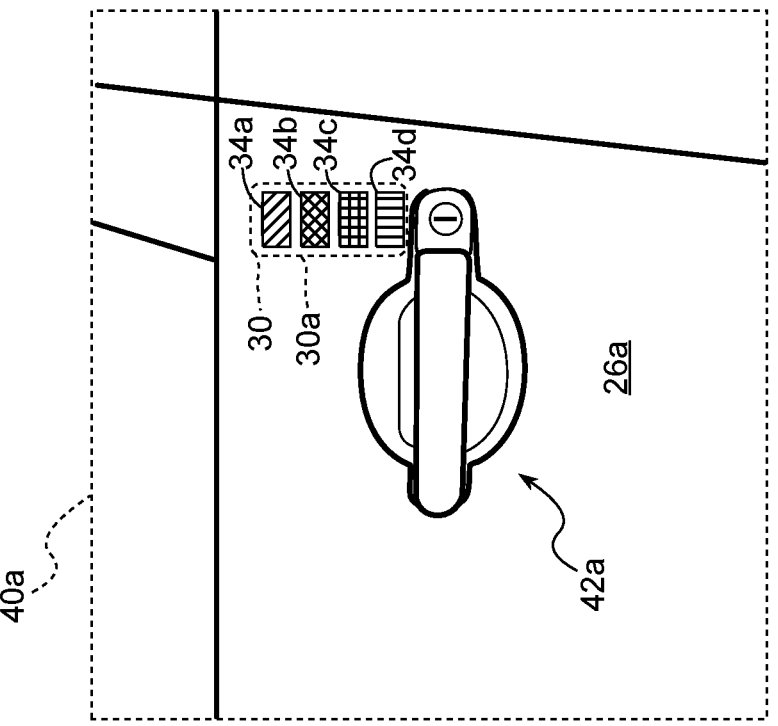
FIG. 2A is a schematic diagram of an exterior passenger door surface of a passenger door of the vehicle including an LED array, according to an exemplary embodiment.

Referring to FIG. 2A, a schematic diagram 40a of the exterior passenger door surface 26a of a passenger door of the vehicle 12 is shown. The exterior passenger door surface 26a includes an exterior passenger handle 42a and a first LED array 30a of the one or more LED arrays 30. The exterior passenger handle 42a is used to unlock and/or open the door the vehicle 12. The first LED array 30a is affixed proximally to the exterior passenger handle 42a, such that the occupant of the vehicle 12 may see which, if any, of the plurality of LEDs 34a, 34b, 34c, 34d is/are illuminated when entering the vehicle 12. In a non-limiting example, the first LED array 30a is affixed by means of an adhesive and/or screw connection to the exterior passenger door surface 26a. In another non-limiting example, the first LED array 30a is affixed within a hole or other recess of the exterior passenger door surface 26a and protected from the environment by a translucent substrate (e.g., glass, acrylic glass, and/or the like). It should be understood that any additional means for affixing the first LED array 30a to the exterior passenger door surface 26a is within the scope of the present disclosure. It should further be understood that the location and configuration of the first LED array 30a discussed above is merely exemplary in nature, and that variations in location and/or configuration are within the scope of the present disclosure. The first LED array 30a is in electrical communication with the controller 14, as discussed above.

Referring to FIG. 2B, a schematic diagram 40b of an interior passenger door surface 26b of the passenger door of the vehicle 12 is shown. The interior passenger door surface 26b includes an interior handle 42a and a second LED array 30b of the one or more LED arrays 30. The interior passenger handle 42b is used to unlock and/or open the door the vehicle 12. The second LED array 30b is affixed proximally to the interior passenger handle 42b, such that the occupant of the vehicle 12 may see which, if any, of the plurality of LEDs 34a, 34b, 34c, 34d is/are illuminated when exiting the vehicle 12. In a non-limiting example, the second LED array 30b is affixed by means of an adhesive and/or screw connection to the interior passenger door surface 26b. In another non-limiting example, the second LED array 30b is affixed within a hole or other recess of the interior passenger door surface 26b and protected by a translucent substrate (e.g., glass, acrylic glass, and/or the like). It should be understood that any additional means for affixing the second LED array 30b to the interior passenger door surface 26b is within the scope of the present disclosure. It should further be understood that the location and configuration of the second LED array 30b discussed above is merely exemplary in nature, and that variations in location and/or configuration are within the scope of the present disclosure. The second LED array 30b is in electrical communication with the controller 14, as discussed above.

Figure 3:
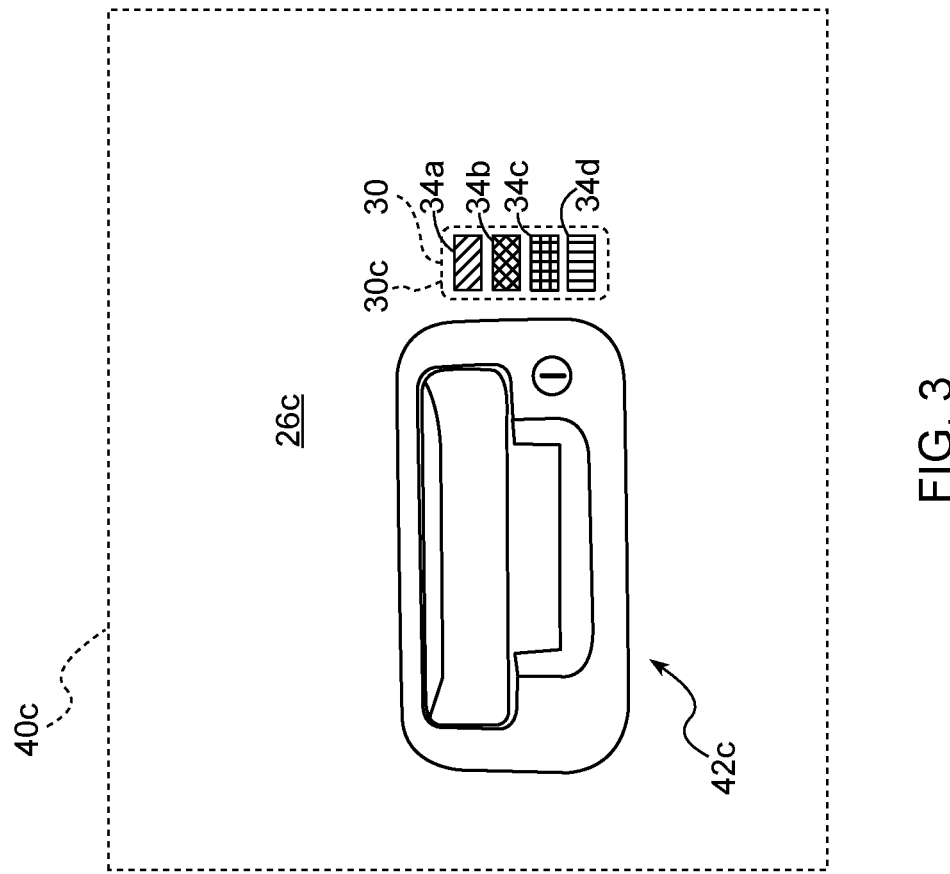
FIG. 3 is a schematic diagram of an exterior cargo door surface of a cargo door of the vehicle including an LED array, according to an exemplary embodiment.

Referring to FIG. 3, a schematic diagram 40c of an exterior cargo door surface 26c of a cargo door of the vehicle 12 is shown. In the scope of the present disclosure, the cargo door of the vehicle 12 includes, for example, a trunk, a frunk, a hatch, a liftgate, a tailgate, and/or the like. The exterior cargo door surface 26c includes an exterior cargo handle 42c and a third LED array 30c of the one or more LED arrays 30. The exterior cargo handle 42c is used to unlock and/or open the cargo door of the vehicle 12. The third LED array 30c is affixed proximally to the exterior cargo handle 42c, such that the occupant of the vehicle 12 may see which, if any, of the plurality of LEDs 34a, 34b, 34c, 34d is/are illuminated when opening the cargo door of the vehicle 12. In a non-limiting example, the third LED array 30c is affixed by means of an adhesive and/or screw connection to the exterior cargo door surface 26c. In another non-limiting example, the third LED array 30c is affixed within a hole or other recess of the exterior cargo door surface 26c and protected from the environment by a translucent substrate (e.g., glass, acrylic glass, and/or the like). It should be understood that any additional means for affixing the third LED array 30c to the exterior cargo door surface 26c is within the scope of the present disclosure. It should be understood that the location and configuration of the third LED array 30c discussed above is merely exemplary in nature, and that variations in location and/or configuration are within the scope of the present disclosure. The third LED array 30c is in electrical communication with the controller 14, as discussed above. In some embodiments, a fourth LED array (not shown) may be affixed to an interior cargo door surface (not shown) of the cargo door of the vehicle 12 to provide information about clearance to occupants opening the cargo door from the inside of the vehicle 12.

Referring again to FIG. 1, the infotainment display 32 is a display located in view of the occupant (e.g., adjacent to a dashboard of the vehicle 12) and capable of displaying text, graphics and/or images. It is to be understood that HMI display systems including LCD displays, LED displays, and the like are within the scope of the present disclosure. Further exemplary embodiments where the infotainment display 32 is disposed in a rearview mirror are also within the scope of the present disclosure. In another exemplary embodiment, the infotainment display 32 includes a head-up display (HUD) configured to provide information to the occupant by projecting text, graphics, and/or images upon the windscreen of the vehicle 12. The text, graphics, and/or images are reflected by the windscreen of the vehicle 12 and are visible to the occupant without looking away from a roadway ahead of the vehicle 12. In another exemplary embodiment, the infotainment display 32 includes an augmented reality head-up display (AR-HUD). The AR-HUD is a type of HUD configured to augment the occupant's vision of the roadway ahead of the vehicle 12 by overlaying text, graphics, and/or images on physical objects in the environment surrounding the vehicle 12 within a field-of-view of the occupant. In an exemplary embodiment, the occupant may interact with the infotainment display 32 using a human-interface device (HID), including, for example, a touchscreen, an electromechanical switch, a capacitive switch, a rotary knob, and the like. It should be understood that additional systems for displaying information to the occupant of the vehicle 12 are also within the scope of the present disclosure.

Figure 4:
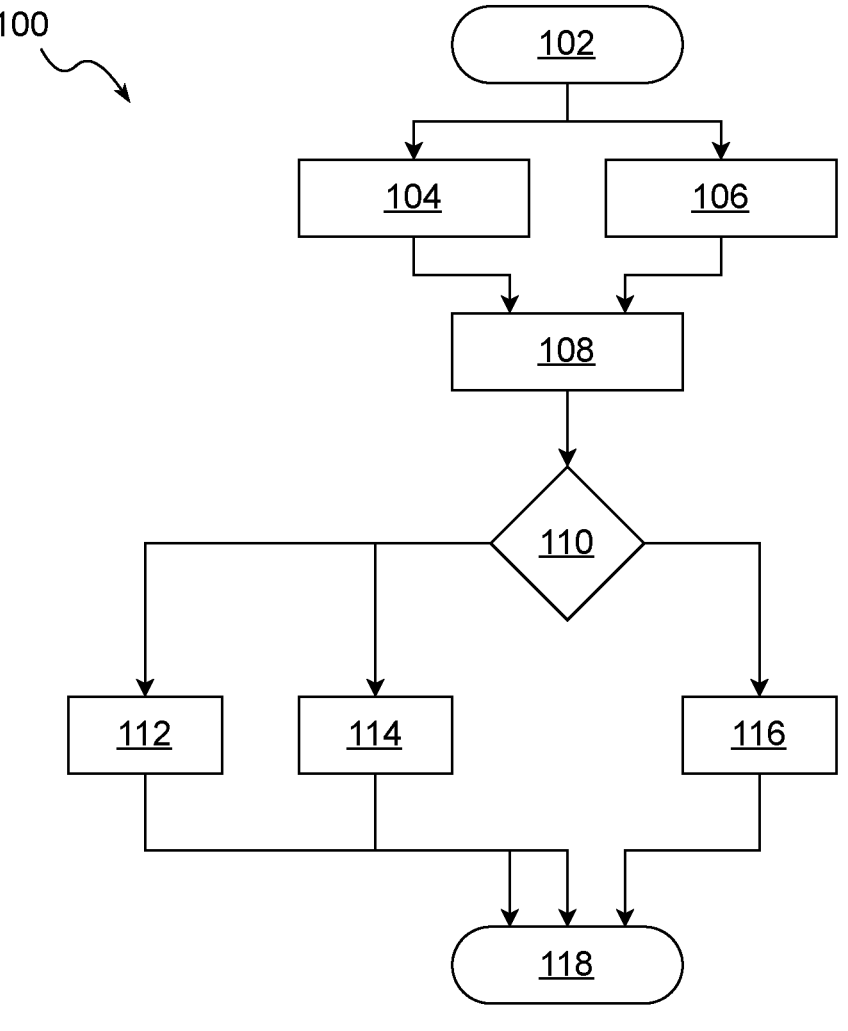
FIG. 4 is a flowchart of a method for determining horizontal clearance for a vehicle, according to an exemplary embodiment.

Referring to FIG. 4, a flowchart of the method 100 is shown. The method 100 begins at block 102 and proceeds to blocks 104 and 106. At block 104, the controller 14 determines one or more predetermined clearance distance thresholds 50a, 50b, 50c, 50d (FIGS. 5-8). The one or more predetermined clearance distance thresholds 50a, 50b, 50c, 50d (FIGS. 5-8) indicate how far the door of the vehicle 12 may be opened. In a non-limiting example, the distance which the door of the vehicle 12 may be opened is limited by objects in the environment surrounding the vehicle 12, as will be discussed in greater detail below.

In an exemplary embodiment, the one or more clearance distance thresholds 50a, 50b, 50c, 50d (FIGS. 5-8) includes at least: a first clearance distance threshold 50a, a second clearance distance threshold 50b, a third clearance distance threshold 50c, and a fourth clearance distance threshold 50d. The first clearance distance threshold 50a indicates that the door of the vehicle 12 is openable to an entirety of a full opening distance. In the scope of the present disclosure, the full opening distance is a maximum distance (or opening angle) which the door is designed to open. The second clearance distance threshold 50b indicates that the door of the vehicle 12 is openable to two thirds of the full opening distance. The third clearance distance threshold 50c indicates that the door of the vehicle 12 is openable to one third of the full opening distance. The fourth clearance distance threshold 50d indicates that the door of the vehicle 12 is not openable.

In an exemplary embodiment, the one or more predetermined clearance distance thresholds 50a, 50b, 50c, 50d (FIGS. 5-8) are retrieved from the media 22 of the controller 14. In another exemplary embodiment, the one or more predetermined clearance distance thresholds 50a, 50b, 50c, 50d (FIGS. 5-8) are stored on a remote server system and retrieved using a vehicle communication system in electrical communication with the controller 14. In a non-limiting example, the one or more predetermined clearance distance thresholds 50a, 50b, 50c, 50d (FIGS. 5-8) are determined based at least in part on at least one of: one or more dimensions of the vehicle 12 (e.g., a length, a width, and a height of the vehicle 12) and one or more dimensions of one or more doors of the vehicle 12 (e.g., a door length, a door width, a door height, the full opening distance, a full opening angle, and/or the like). After block 104, the method proceeds to block 108, as will be discussed in greater detail below.

At block 106, the controller 14 uses the ranging sensor 16 to determine an available clearance distance 52a, 52b, 52c, 52d (FIGS. 5-8) between one or more doors of the vehicle 12 and an object 54 (FIGS. 5-8) in the environment surrounding the vehicle 12. In the scope of the present disclosure, the object 54 (FIGS. 5-8) includes, for example, another vehicle, a structure (e.g., a wall of a parking garage, a guardrail, a curb), a pedestrian, and/or other obstacle within an opening path of the one or more doors of the vehicle 12.

In a first exemplary embodiment, the controller 14 uses the one or more ultrasonic distance measurement sensors 24 to measure the available clearance distance 52a, 52b, 52c, 52d (FIGS. 5-8) between the one or more doors of the vehicle 12 and the object 54 (FIGS. 5-8). In a second exemplary embodiment, the controller 14 uses the camera system 28 to capture a plurality of images of the environment surrounding the vehicle 12. Using computer vision methods, the controller 14 determines the available clearance distance 52a, 52b, 52c, 52d (FIGS. 5-8) based at least in part on the plurality of images. After block 106, the method 100 proceeds to block 108.

At block 108, the controller 14 compares the available clearance distance 52a, 52b, 52c, 52d (FIGS. 5-8) determined at block 106 to the one or more predetermined clearance distance thresholds 50a, 50b, 50c, 50d (FIGS. 5-8) determined at block 104. After block 108, the method 100 proceeds to block 110.

At block 110, the controller 14 determines a location of the occupant relative to the vehicle 12. In the scope of the present disclosure, the location of the occupant relative to the vehicle 12 includes one of: inside of the vehicle 12 and outside of the vehicle 12. In an exemplary embodiment, to determine the location of the occupant relative to the vehicle 12, the controller 14 uses one or more vehicle sensors. In a non-limiting example, the one or more vehicle sensors include, for example, a seat occupancy sensor, an interior camera system, and/or the like. For example, the controller 14 may electrically communicate with the seat occupancy sensor to determine whether the occupant is currently occupying a seat of the vehicle 12. If the occupant is occupying a seat of the vehicle 12, the location of the occupant relative to the vehicle 12 is determined to be inside of the vehicle 12. In another example, the controller 14 may capture one or more images of an interior of the vehicle 12 using the interior camera system. The controller 14 subsequently uses a computer vison algorithm to search for the occupant in the one or more images. If the occupant is present in the interior of the vehicle 12 in the one or more images, the location of the occupant relative to the vehicle 12 is determined to be inside of the vehicle 12.

In another exemplary embodiment, the controller 14 uses the camera system 28 to determine the location of the occupant relative to the vehicle 12. In a non-limiting example, the controller 14 uses the camera system 28 to capture a plurality of images of the environment surrounding the vehicle 12. The controller 14 subsequently uses a computer vison algorithm to search for the occupant in the plurality of images. If the occupant is present in the environment surrounding the vehicle 12 in the plurality of images, the location of the occupant relative to the vehicle 12 is determined to be outside of the vehicle 12.

In another exemplary embodiment, the controller 14 uses a vehicle communication system to wirelessly communicate with one or more wireless mobile devices of the occupant (e.g., a cellular telephone, a smartphone, a tablet, a smartwatch, a vehicle key fob, and/or the like). Based on, for example a signal strength of communication between the vehicle communication system and the one or more wireless mobile devices, the controller 14 determines the location of the occupant relative to the vehicle 12.

It should be understood that any additional systems and/or methods for determining the location of the occupant relative to the vehicle 12 and/or occupancy status of the vehicle 12 are within the scope of the present disclosure. If the location of the occupant relative to the vehicle 12 is determined to be inside of the vehicle 12, the method 100 proceeds to blocks 112 and 114. If the location of the occupant relative to the vehicle 12 is determined to be outside of the vehicle 12, the method 100 proceeds to block 116, as will be discussed in greater detail below. In another exemplary embodiment, block 110 of the method 100 is bypassed and the method 100 proceeds directly from block 108 to blocks 112, 114, and 116.

Figure 5:
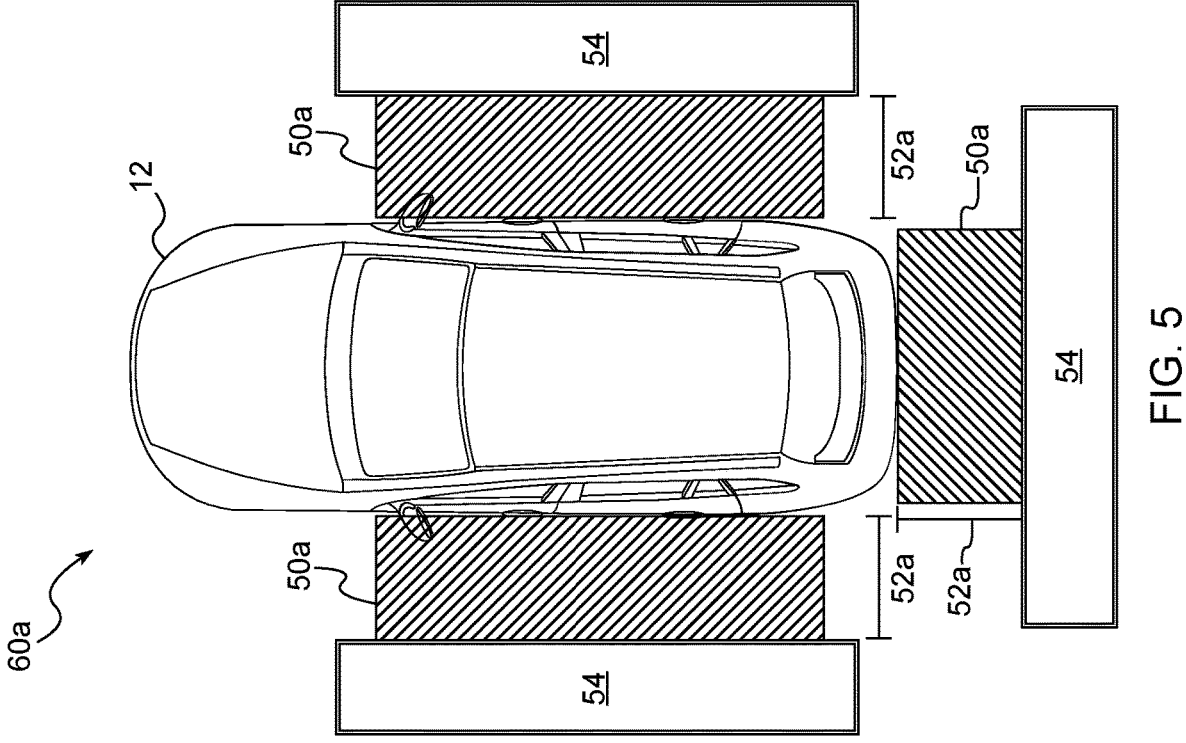
FIG. 5 is a first visual representation of the vehicle for display using an infotainment system, according to an exemplary embodiment.

Referring to FIG. 5, a first visual representation 60a of the vehicle 12 is shown. The first visual representation 60a depicts a first available clearance distance 52a between the vehicle 12 and the object 54 relative to the first clearance distance threshold 50a. In a non-limiting example, the first clearance distance threshold 50a is shown as a green shaded region to indicate to the occupant of the vehicle 12 that the door of the vehicle 12 is openable to the entirety of the full opening distance without collision with the object 54.

Figure 6:
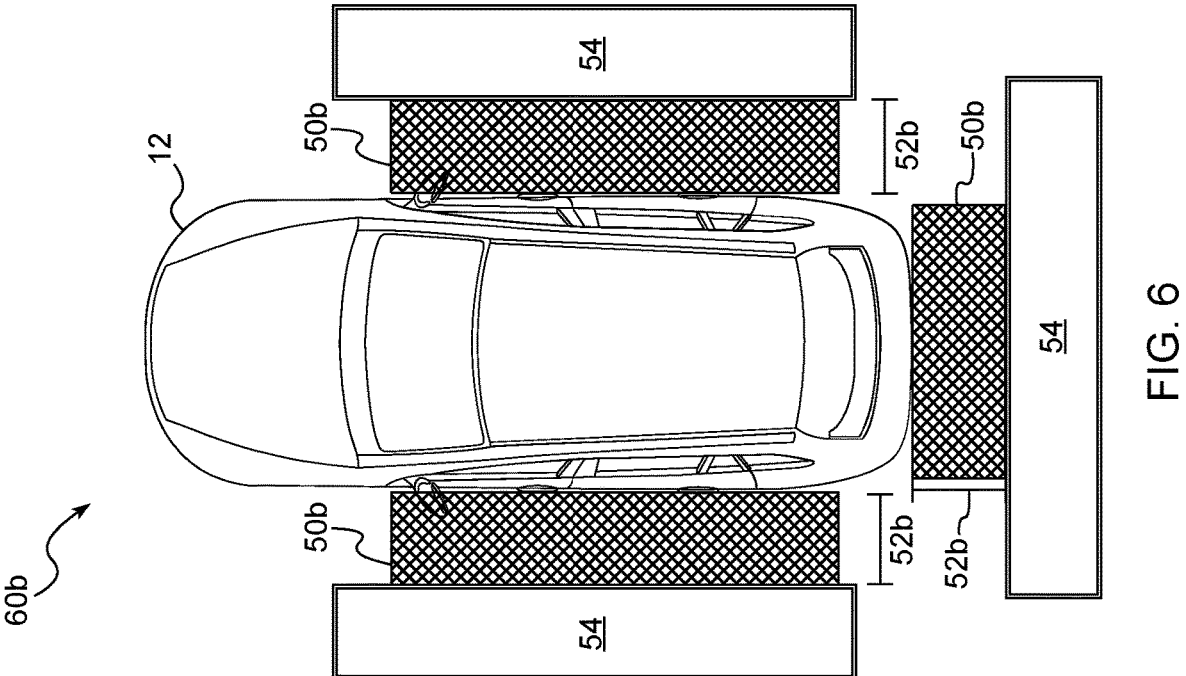
FIG. 6 is a second visual representation of the vehicle for display using an infotainment system, according to an exemplary embodiment.

Referring to FIG. 6, a second visual representation 60b of the vehicle 12 is shown. The second visual representation 60b depicts a second available clearance distance 52b between the vehicle 12 and the object 54 relative to the second clearance distance threshold 50b. In a non-limiting example, the second clearance distance threshold 50b is shown as an orange shaded region to indicate to the occupant of the vehicle 12 that the door of the vehicle 12 is openable to two thirds of the full opening distance without collision with the object 54. Therefore, the second clearance distance threshold 50b is less than the first clearance distance threshold 50a, as shown in FIGS. 5-6.

Figure 7:
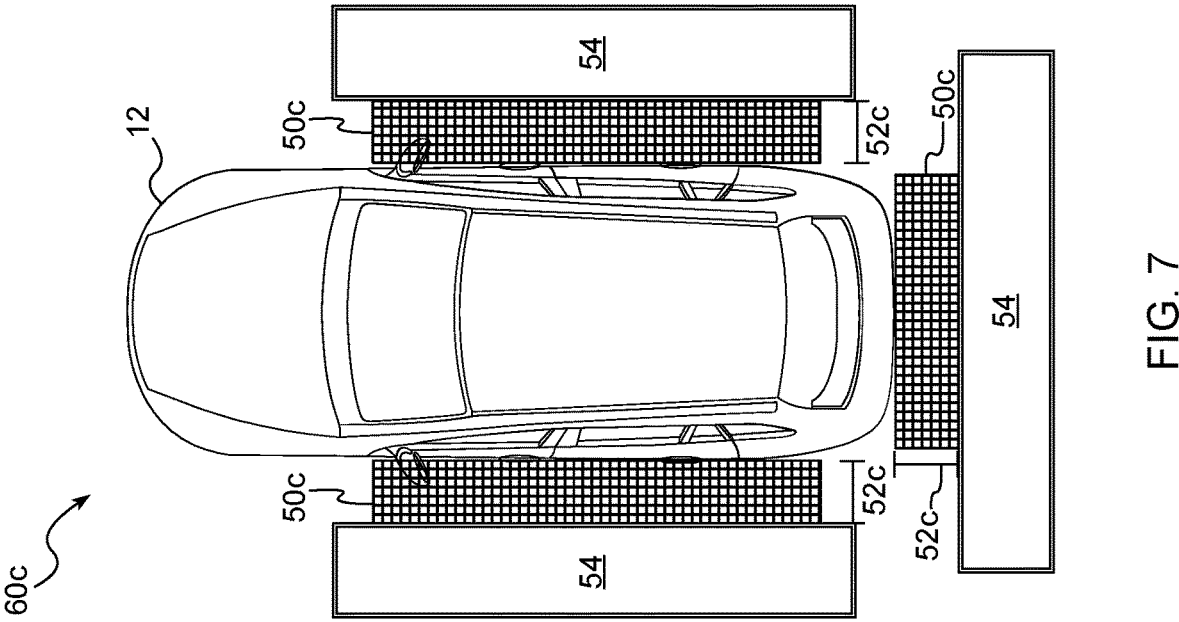
FIG. 7 is a third visual representation of the vehicle for display using an infotainment system, according to an exemplary embodiment.

Referring to FIG. 7, a third visual representation 60c of the vehicle 12 is shown. The third visual representation 60c depicts a third available clearance distance 52c between the vehicle 12 and the object 54 relative to the third clearance distance threshold 50c. In a non-limiting example, the third clearance distance threshold 50c is shown as a yellow shaded region to indicate to the occupant of the vehicle 12 that the door of the vehicle 12 is openable to one third of the full opening distance without collision with the object 54. Therefore, the third clearance distance threshold 50c is less than the first clearance distance threshold 50a and the second clearance distance threshold 50b, as shown in FIGS. 5-7.

Figure 8:
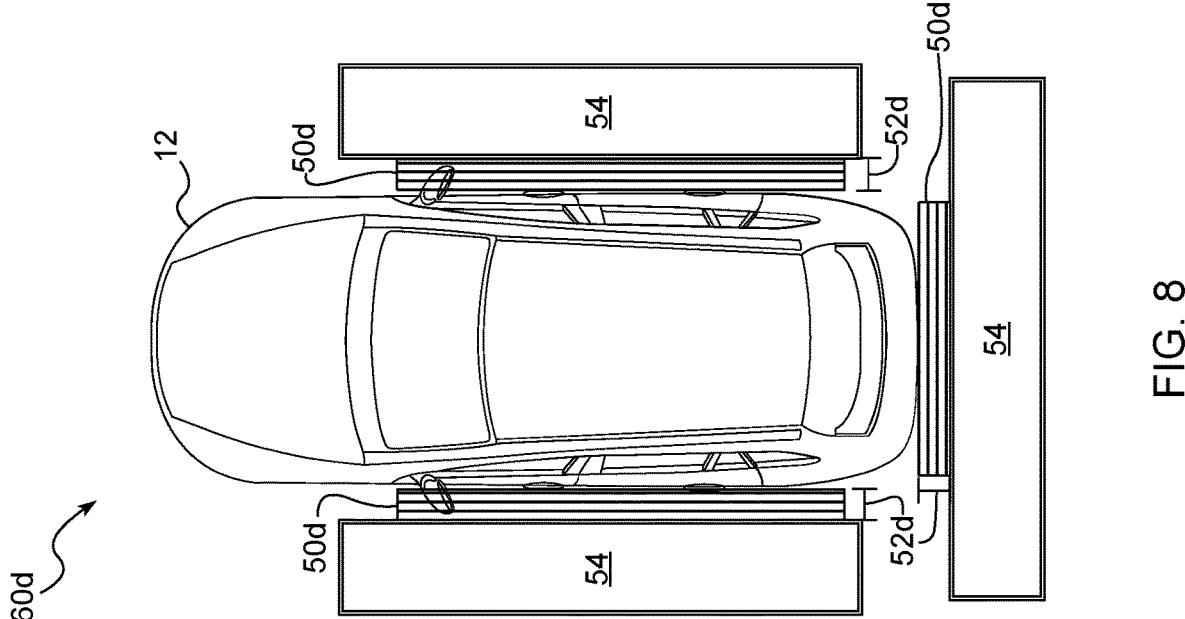
FIG. 8 is a fourth visual representation of the vehicle for display using an infotainment system, according to an exemplary embodiment.

Referring to FIG. 8, a fourth visual representation 60d of the vehicle 12 is shown. The fourth visual representation 60d depicts a fourth available clearance distance 52d between the vehicle 12 and the object 54 relative to the fourth clearance distance threshold 50d. In a non-limiting example, the fourth clearance distance threshold 50d is shown as a red shaded region to indicate to the occupant of the vehicle 12 that the door of the vehicle 12 is not openable without collision with the object 54. Therefore, the fourth clearance distance threshold 50d is less than the first clearance distance threshold 50a, the second clearance distance threshold 50b, and the third clearance distance threshold, as shown in FIGS. 5-8.

In an exemplary embodiment, the first visual representation 60a, the second visual representation 60b, the third visual representation 60c, and the fourth visual representation 60d are generated based at least in part on a plurality of images of the environment surrounding the vehicle 12 captured using the camera system 28. In a non-limiting example, the controller 14 stitches the plurality of images together with a graphical representation of the vehicle 12 to generate the first visual representation 60a, the second visual representation 60b, the third visual representation 60c, and the fourth visual representation 60d. In some embodiments, the first visual representation 60a, the second visual representation 60b, the third visual representation 60c, and the fourth visual representation 60d include live video feeds and/or are regularly updated, such that the occupant may observe changes in the environment surrounding the vehicle 12.

In FIGS. 5-8, the available clearance distance 52a, 52b, 52c, 52d and the one or more predetermined clearance distance thresholds 50a, 50b, 50c, 50d are depicted as the same for all doors of the vehicle 12 (i.e., passenger doors and cargo doors). It should be understood that FIGS. 5-8 are not to scale, and that the available clearance distance 52a, 52b, 52c, 52d and the one or more predetermined clearance distance thresholds 50a, 50b, 50c, 50d may vary for different doors of the vehicle based on variations in door size and opening characteristics. It should further be understood that the first visual representation 60a, the second visual representation 60b, the third visual representation 60c, and the fourth visual representation 60d are merely exemplary in nature, and that variations in design, color, style, presentation, and/or the like do not constitute a departure from the scope of the present disclosure.

Referring again to FIG. 4, at block 112, the controller 14 uses the infotainment display 32 to provide an indication of the available clearance distance 52a, 52b, 52c, 52d (FIGS. 5-8) relative to the one or more predetermined clearance distance thresholds 50a, 50b, 50c, 50d (FIGS. 5-8). In an exemplary embodiment, the controller 14 uses the infotainment display 32 to display at least one of the first visual representation 60a, the second visual representation 60b, the third visual representation 60c, and the fourth visual representation 60d based at least in part on the comparison between the available clearance distance 52a, 52b, 52c, 52d (FIGS. 5-8) and the one or more predetermined clearance distance thresholds 50a, 50b, 50c, 50d (FIGS. 5-8) performed at block 108.

If the available clearance distance 52a, 52b, 52c, 52d (FIGS. 5-8) is greater than or equal to the first clearance distance threshold 50a, the controller 14 displays the first visual representation 60a (FIG. 5) using the infotainment display 32. If the available clearance distance 52a, 52b, 52c, 52d (FIGS. 5-8) is greater than or equal to the second clearance distance threshold 50b and less than first clearance distance threshold 50a, the controller 14 displays the second visual representation 60b (FIG. 6) using the infotainment display 32. If the available clearance distance 52a, 52b, 52c, 52d (FIGS. 5-8) is greater than or equal to the third clearance distance threshold 50c and less than second clearance distance threshold 50b, the controller 14 displays the third visual representation 60c (FIG. 7) using the infotainment display 32. If the available clearance distance 52a, 52b, 52c, 52d (FIGS. 5-8) is less than or equal to the fourth clearance distance threshold 50d, the controller 14 displays the fourth visual representation 60d (FIG. 8) using the infotainment display 32. After block 112, the method 100 proceeds to enter a standby state at block 118.

At block 114, the controller 14 uses the second LED array 30b (FIG. 2B) affixed to the interior passenger door surface 26b and/or interior cargo door surface (not shown) of the door of the vehicle 12 to provide an indication of the available clearance distance 52a, 52b, 52c, 52d (FIGS. 5-8) relative to the one or more predetermined clearance distance thresholds 50a, 50b, 50c, 50d (FIGS. 5-8).

If the available clearance distance 52a, 52b, 52c, 52d (FIGS. 5-8) is greater than or equal to the first clearance distance threshold 50a, the controller 14 illuminates the first LED 34a (i.e., the green LED) of the second LED array 30b. If the available clearance distance 52a, 52b, 52c, 52d (FIGS. 5-8) is greater than or equal to the second clearance distance threshold 50b and less than first clearance distance threshold 50a, the controller 14 illuminates the second LED 34b (i.e., the orange LED) of the second LED array 30b. If the available clearance distance 52a, 52b, 52c, 52d (FIGS. 5-8) is greater than or equal to the third clearance distance threshold 50c and less than second clearance distance threshold 50b, the controller 14 illuminates the third LED 34c (i.e., the yellow LED) of the second LED array 30b. If the available clearance distance 52a, 52b, 52c, 52d (FIGS. 5-8) is less than or equal to the fourth clearance distance threshold 50d, the controller 14 illuminates the fourth LED 34d (i.e., the red LED) of the second LED array 30b. After block 114, the method 100 proceeds to enter the standby state at block 118.

At block 116, the controller 14 uses the first LED array 30a (FIG. 2A) affixed to the exterior passenger door surface 26a and/or exterior cargo door surface 26c of the door of the vehicle 12 to provide an indication of the available clearance distance 52a, 52b, 52c, 52d (FIGS. 5-8) relative to the one or more predetermined clearance distance thresholds 50a, 50b, 50c, 50d (FIGS. 5-8).

If the available clearance distance 52a, 52b, 52c, 52d (FIGS. 5-8) is greater than or equal to the first clearance distance threshold 50a, the controller 14 illuminates the first LED 34a (i.e., the green LED) of the first LED array 30a. If the available clearance distance 52a, 52b, 52c, 52d (FIGS. 5-8) is greater than or equal to the second clearance distance threshold 50b and less than first clearance distance threshold 50a, the controller 14 illuminates the second LED 34b (i.e., the orange LED) of the first LED array 30a. If the available clearance distance 52a, 52b, 52c, 52d (FIGS. 5-8) is greater than or equal to the third clearance distance threshold 50c and less than second clearance distance threshold 50b, the controller 14 illuminates the third LED 34c (i.e., the yellow LED) of the first LED array 30a. If the available clearance distance 52a, 52b, 52c, 52d (FIGS. 5-8) is less than or equal to the fourth clearance distance threshold 50d, the controller 14 illuminates the fourth LED 34d (i.e., the red LED) of the first LED array 30a. After block 116, the method 100 proceeds to enter the standby state at block 118.

In an exemplary embodiment, the controller 14 repeatedly exits the standby state 118 and restarts the method 100 at block 102. In a non-limiting example, the controller 14 exits the standby state 118 and restarts the method 100 on a timer, for example, every three hundred milliseconds.

The system 10 and method 100 of the present disclosure offer several advantages. By determining the available clearance distance 52a, 52b, 52c, 52d (FIGS. 5-8) using the ranging sensor 16 (e.g., the one or more ultrasonic distance measurement sensors 24), the system 10 and method 100 may determine an available clearance distance for each door of the vehicle 12, allowing the system 10 and method 100 to account for environments having complex or irregular structures near the vehicle. Furthermore, by providing feedback to the occupant of the vehicle 12 by means of the at least one LED array 30 (e.g., the first LED array 30a and/or the second LED array 30b), the occupant receives relevant information about horizontal clearance when operating a door of the vehicle. Furthermore, the use of the infotainment display 32 to display one of the visual representations 60a, 60b, 60c, 60d of the vehicle 12 with the available clearance distance 52a, 52b, 52c, 52d (FIGS. 5-8) relative to the one or more predetermined clearance distance thresholds 50a, 50b, 50c, 50d (FIGS. 5-8) provides the occupant with additional information about the horizontal clearance.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for determining horizontal clearance for a vehicle, the system comprising:
   a ranging sensor configured to measure a distance between the vehicle and an object in an environment surrounding the vehicle;
   a human-machine interface (HMI) having a display including:
      a first LED array affixed to an exterior surface of a door of the vehicle adjacent to an exterior handle of the door of the vehicle;
      a second LED array affixed to an interior surface of the door of the vehicle adjacent to an interior handle of the door of the vehicle; and
   a controller in electrical communication with the ranging sensor and the HMI, wherein the controller is programmed to:
      determine an available clearance distance between a door of the vehicle and the object in the environment surrounding the vehicle using the ranging sensor;
      compare the available clearance distance to one or more predetermined clearance distance thresholds; and
      provide information to an occupant of the vehicle using the HMI based at least in part on the available clearance distance and the one or more predetermined clearance distance thresholds.

2. The system of claim 1, wherein the one or more predetermined clearance distance thresholds includes at least: a first clearance distance threshold indicating that the door of the vehicle is openable to an entirety of a full opening distance, a second clearance distance threshold indicating that the door of the vehicle is openable to two thirds of the full opening distance, a third clearance distance threshold indicating that the door of the vehicle is openable to one third of the full opening distance, and a fourth clearance distance threshold indicating that the door of the vehicle is not openable.

3. The system of claim 2, wherein the one or more predetermined clearance distance thresholds are determined based at least in part on at least one of: one or more dimensions of the vehicle and one or more dimensions of the door of the vehicle.

4. The system of claim 2, wherein the HMI further comprises at least one display, and wherein to provide information to the occupant of the vehicle, the controller is further programmed to:
   provide a first indication to the occupant of the vehicle using the at least one display in response to determining that the available clearance distance is greater than or equal to the first clearance distance threshold;
   provide a second indication to the occupant of the vehicle using the at least one display in response to determining that the available clearance distance is greater than or equal to the second clearance distance threshold and less than the first clearance distance threshold;
   provide a third indication to the occupant of the vehicle using the at least one display in response to determining that the available clearance distance is greater than or equal to the third clearance distance threshold and less than the second clearance distance threshold; and provide a fourth indication to the occupant of the vehicle using the at least one display in response to determining that the available clearance distance is less than or equal to the fourth clearance distance threshold.

5. The system of claim 4, wherein:

the first indication includes illuminating a first LED of the first LED array or the second LED array;

the second indication includes illuminating a second LED of the first LED array or the second LED array;

the third indication includes illuminating a third LED of the first LED array or the second LED array; and the fourth indication includes illuminating a fourth LED of the first LED array or the second LED array.

6. The system of claim 4, wherein the at least one display includes an infotainment display, and wherein:

the first indication includes a visual representation of the vehicle depicting the available clearance distance relative to the first clearance distance threshold;

the second indication includes the visual representation of the vehicle depicting the available clearance distance relative to the second clearance distance threshold and the first clearance distance threshold;

the third indication includes the visual representation of the vehicle depicting the available clearance distance relative to the third clearance distance threshold and the second clearance distance threshold; and the fourth indication includes the visual representation of the vehicle depicting the available clearance distance relative to the fourth clearance distance threshold.

7. The system of claim 6, wherein to provide information to the occupant of the vehicle, the controller is further programmed to:

determine a location of the occupant relative to the vehicle, wherein the location of the occupant includes one of: inside of the vehicle and outside of the vehicle; and provide at least one of: the first indication, the second indication, the third indication, and the fourth indication using the infotainment display in response to determining that the location of the occupant is inside of the vehicle.

8. The system of claim 1, wherein the ranging sensor further comprises one or more ultrasonic distance measurement sensors affixed to the door of the vehicle, and wherein to determine the available clearance distance, the controller is further programmed to:

determine the available clearance distance between a door of the vehicle and the object in the environment surrounding the vehicle using the one or more ultrasonic distance measurement sensors.

9. The system of claim 1, wherein the ranging sensor further comprises a camera system, and wherein to determine the available clearance distance the controller is further programmed to:

determine the available clearance distance between a door of the vehicle and the object in the environment surrounding the vehicle using the camera system.

10. A method for determining horizontal clearance for a vehicle, the method comprising:

determining an available clearance distance between a door of the vehicle and an object in an environment surrounding the vehicle using a ranging sensor;

comparing the available clearance distance to one or more predetermined clearance distance thresholds; and providing information to an occupant of the vehicle using a human-machine interface (HMI) based at least in part on the available clearance distance and the one or more predetermined clearance distance thresholds, wherein the HMI further comprises at least one of: a first LED array affixed to an exterior surface of the door of the vehicle adjacent to an exterior handle of the door of the vehicle and a second LED array affixed to an interior surface of the door of the vehicle adjacent to an interior handle of the door of the vehicle.

11. The method of claim 10, wherein comparing the available clearance distance to the one or more predetermined clearance distance thresholds further comprises:

comparing the available clearance distance to a first clearance distance threshold indicating that the door of the vehicle is openable to an entirety of a full opening distance;

comparing the available clearance distance to a second clearance distance threshold indicating that the door of the vehicle is openable to two thirds of the full opening distance;

comparing the available clearance distance to a third clearance distance threshold indicating that the door of the vehicle is openable to one third of the full opening distance; and comparing the available clearance distance to a fourth clearance distance threshold indicating that the door of the vehicle is not openable.

12. The method of claim 11, wherein providing information to the occupant of the vehicle further comprises:

providing a first indication to the occupant of the vehicle using the HMI in response to determining that the available clearance distance is greater than or equal to the first clearance distance threshold;

providing a second indication to the occupant of the vehicle using the HMI in response to determining that the available clearance distance is greater than or equal to the second clearance distance threshold and less than the first clearance distance threshold;

providing a third indication to the occupant of the vehicle using the HMI in response to determining that the available clearance distance is greater than or equal to the third clearance distance threshold and less than the second clearance distance threshold; and providing a fourth indication to the occupant of the vehicle using the HMI in response to determining that the available clearance distance is less than or equal to the fourth clearance distance threshold.

13. The method of claim 12, wherein providing information to the occupant of the vehicle further comprises:

illuminating a first LED of at least one of: the first LED array of the HMI affixed to an exterior surface of the door of the vehicle adjacent to an exterior handle of the door of the vehicle and the second LED array of the HMI affixed to an interior surface of the door of the vehicle adjacent to an interior handle of the door of the vehicle to provide the first indication;

illuminating a second LED of at least one of: the first LED array and the second LED array to provide the second indication;

illuminating a third LED of at least one of: the first LED array and the second LED array to provide the third indication; and illuminating a fourth LED of at least one of: the first LED array and the second LED array to provide the fourth indication.

14. The method of claim 13, wherein providing information to the occupant of the vehicle further comprises:

displaying a visual representation of the vehicle depicting the available clearance distance relative to the first clearance distance threshold using an infotainment display of the HMI to provide the first indication;

displaying the visual representation of the vehicle depicting the available clearance distance relative to the second clearance distance threshold and the first clearance distance threshold using the infotainment display of the HMI to provide the second indication;

displaying the visual representation of the vehicle depicting the available clearance distance relative to the third clearance distance threshold and the second clearance distance threshold using the infotainment display of the HMI to provide the third indication; and displaying the visual representation of the vehicle depicting the available clearance distance relative to the fourth clearance distance threshold using the infotainment display of the HMI to provide the fourth indication.

15. The method of claim 14, providing information to the occupant of the vehicle further comprises:

determining a location of the occupant relative to the vehicle; and providing at least one of: the first indication, the second indication, the third indication, and the fourth indication using at least one of: the infotainment display, the first LED array, and the second LED array based at least in part on the location of the occupant relative to the vehicle.

16. The method of claim 15, providing information to the occupant of the vehicle further comprises:

determining the location of the occupant relative to the vehicle, wherein the location of the occupant includes one of: inside of the vehicle and outside of the vehicle;

providing at least one of: the first indication, the second indication, the third indication, and the fourth indication using the infotainment display and the second LED array in response to determining that the location of the occupant is inside of the vehicle; and providing at least one of: the first indication, the second indication, the third indication, and the fourth indication using the first LED array in response to determining that the location of the occupant is outside of the vehicle.

17. A system for determining horizontal clearance for a vehicle, the system comprising:

a ranging sensor configured to measure a distance between the vehicle and an object in an environment surrounding the vehicle, wherein the ranging sensor includes at least one of: one or more ultrasonic distance measurement sensors and a camera system;

a human-machine interface (HMI) including:

a first LED array affixed to an exterior surface of a door of the vehicle adjacent to an exterior handle of the door of the vehicle;

a second LED array affixed to an interior surface of the door of the vehicle adjacent to an interior handle of the door of the vehicle; and an infotainment display disposed within the vehicle; and a controller in electrical communication with the ranging sensor and the HMI, wherein the controller is programmed to:

determine an available clearance distance between a door of the vehicle and the object in the environment surrounding the vehicle using the ranging sensor;

compare the available clearance distance to a first clearance distance threshold indicating that the door of the vehicle is openable to an entirety of a full opening distance, a second clearance distance threshold indicating that the door of the vehicle is openable to two thirds of the full opening distance, a third clearance distance threshold indicating that the door of the vehicle is openable to one third of the full opening distance, and a fourth clearance distance threshold indicating that the door of the vehicle is not openable; and provide a first indication to an occupant of the vehicle using the HMI in response to determining that the available clearance distance is greater than or equal to the first clearance distance threshold;

provide a second indication to the occupant of the vehicle using the HMI in response to determining that the available clearance distance is greater than or equal to the second clearance distance threshold and less than the first clearance distance threshold;

provide a third indication to the occupant of the vehicle using the HMI in response to determining that the available clearance distance is greater than or equal to the third clearance distance threshold and less than the second clearance distance threshold; and provide a fourth indication to the occupant of the vehicle using the HMI in response to determining that the available clearance distance is less than or equal to the fourth clearance distance threshold.

18. The system of claim 17, wherein the controller is further programmed to:

illuminate a first LED of at least one of: the first LED array the second LED array to provide the first indication;

illuminate a second LED of at least one of: the first LED array and the second LED array to provide the second indication;

illuminate a third LED of at least one of: the first LED array and the second LED array to provide the third indication; and illuminate a fourth LED of at least one of: the first LED array and the second LED array to provide the fourth indication.

19. The system of claim 18, wherein the controller is further programmed to:

display a visual representation of the vehicle depicting the available clearance distance relative to the first clearance distance threshold using the infotainment display to provide the first indication;

display the visual representation of the vehicle depicting the available clearance distance relative to the second clearance distance threshold and the first clearance distance threshold using the infotainment display to provide the second indication;

display the visual representation of the vehicle depicting the available clearance distance relative to the third clearance distance threshold and the second clearance distance threshold using the infotainment display to provide the third indication; and display the visual representation of the vehicle depicting the available clearance distance relative to the fourth clearance distance threshold using the infotainment display to provide the fourth indication.

\* \* \* \* \*